Figure 1:
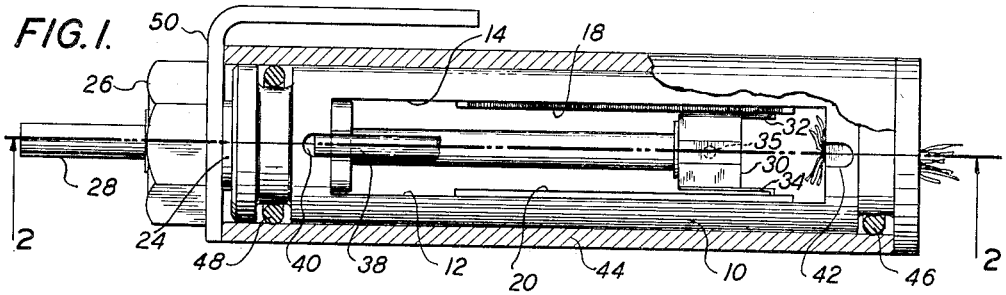

Nov. 12, 1957 J. D. GEARHEART ET AL 2,813,183
ADJUSTABLE RESISTORS
Filed April 4, 1955 2 Sheets-Sheet 1

INVENTORS
JOHN D. GEARHEART
JACK L. SAYRE
BY EDWARD H. REHNBORG

Christie, Parker & Hale
ATTORNEYS

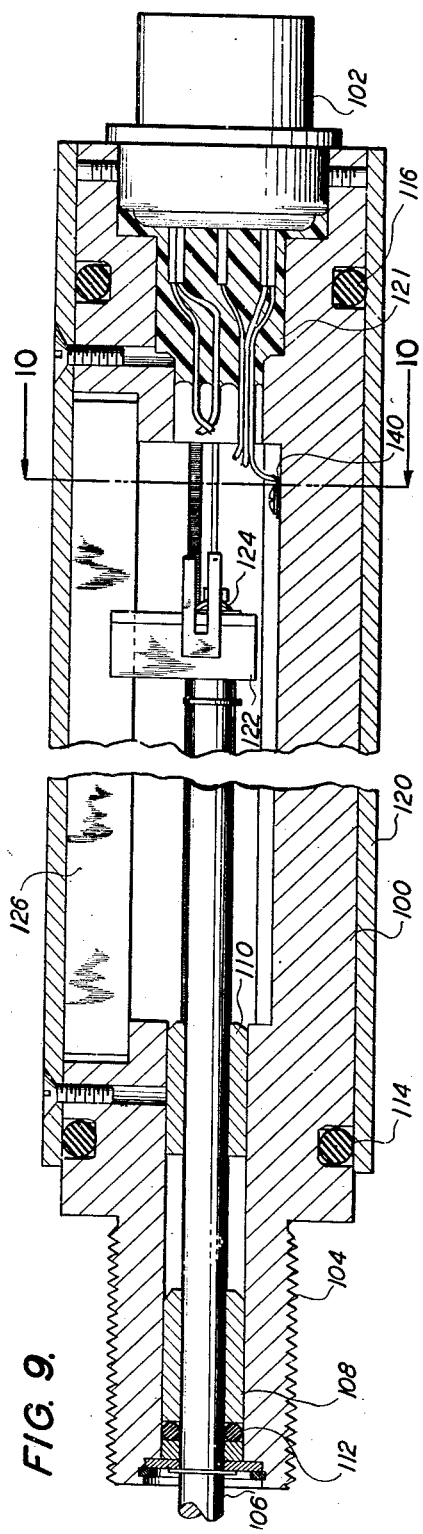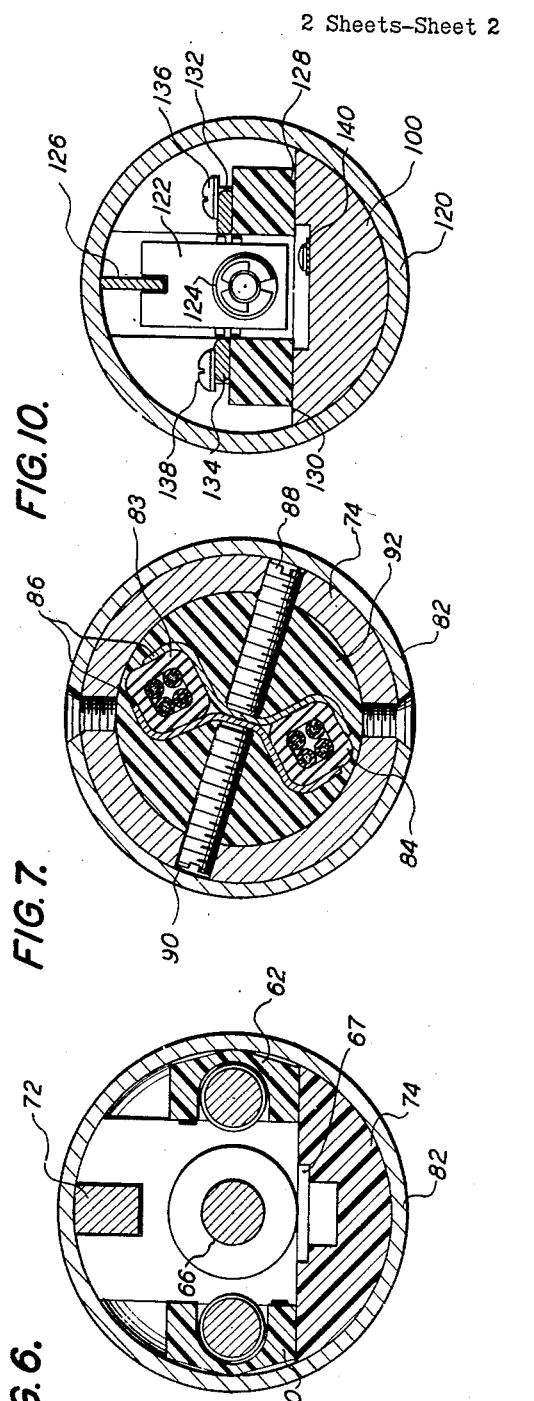

United States Patent Office 2,813,183
Patented Nov. 12, 1957

2,813,183

ADJUSTABLE RESISTORS

John D. Gearheart, Baldwin Park, Jack L. Sayre, Duarte, and Edward H. Rehnborg, San Gabriel, Calif., assignors to Edcliff Instruments, Pasadena, Calif., a corporation of California Application April 4, 1955, Serial No. 499,022

12 Claims. (Cl. 201—62)

This invention relates to improvements in adjustable resistor apparatus, and it has particular reference to apparatus for providing changes in resistance in response to movements of a control member.

Adjustable resistors which provide a change in resistance in response to movement of a control member are widely used in various systems such as servo controls, telemetering, and the like. In many such applications the adjustable resistors are subjected to vibration and high acceleration, and hence they should be of rugged construction so as to provide accurate response under such operating conditions. However, it is also desirable that such adjustable resistors be of compact and lightweight construction and that they be inexpensive. It is difficult to provide a device which meets these requirements and which is also rugged enough to be capable of operating under adverse conditions.

These difficulties are overcome in the present invention by employing a simple framework for supporting the resistance elements, a shaft journalled in one end of the framework and carrying electrical wiper contacts on its inner end for engaging the resistance elements, and a guide means extending along the framework for guiding and stabilizing the wiper assembly at any location along the resistance elements. A housing which fits snugly around the outer periphery of the framework provides a closure for the apparatus. Preferably, the outer periphery of the framework and the housing are of cylindrical shape so as to provide a compact structure of great strength. Seals may be employed between the housing and the framework and between the shaft and the framework so as to make the entire assembly fluid tight.

The wiper assembly may be arranged to have electrical wiper contacts which extend from opposite sides of the assembly so as to provide equal thrust on the opposite sides of the wiper assembly. This feature provides a balanced load on the wiper assembly throughout its path of movement so that the wiper assembly and the shaft on which it is located may be moved without having any tendency to bind.

Preferably, the means for guiding and stabilizing the wiper assembly is a member which is supported in slots in opposite ends of the framework, and the guide member may be secured in the slots by the housing which fits snugly around the framework and provides a closure for the slots.

If desired, the wiper assembly may be journalled on the end of the shaft which carries the wiper so that rotation of the shaft does not affect the operation of the wiper assembly.

The adjustable resistor apparatus of the present invention is lightweight and of compact construction and it is inexpensive and easy to assemble, yet it is of rugged construction and capable of providing reliable operation under adverse conditions.

Figure 2:
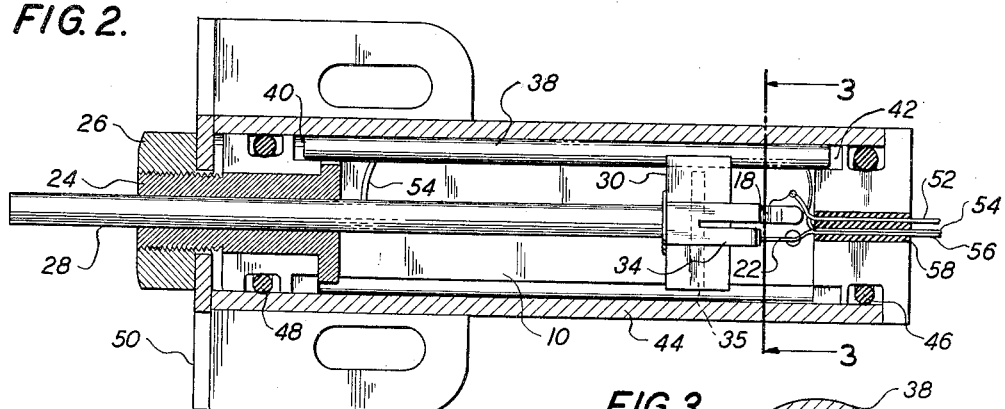
Figures 3, 4:
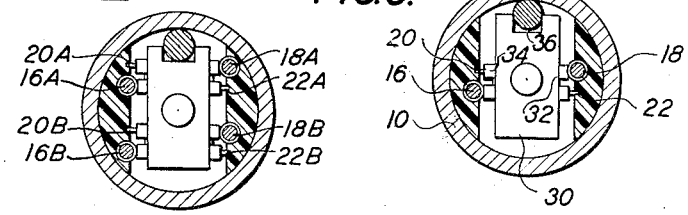
Figure 5:
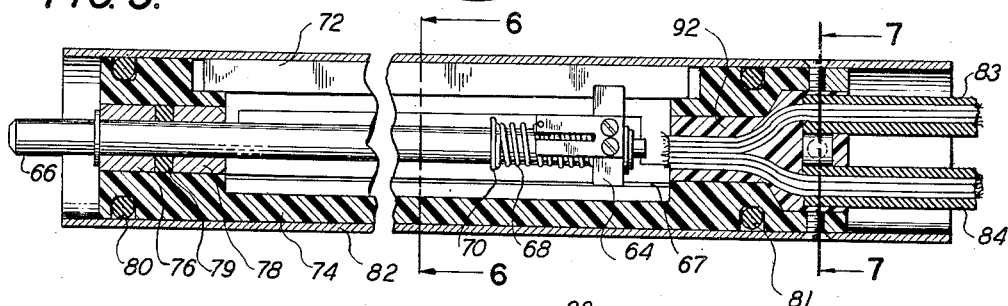
Figure 8:
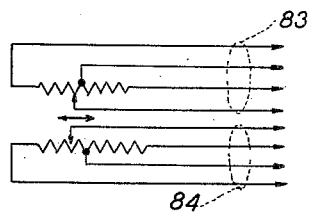

The invention is explained in detail with reference to the drawings, in which:

Fig. 1 is an elevation view, partially in section, of one embodiment of the invention;

Fig. 2 is a sectional view along line 2—2 of Fig. 1;
Fig. 3 is a sectional view along line 3—3 of Fig. 2;
Fig. 4 is a sectional view similar to that of Fig. 3 showing how four resistance elements may be employed;
Fig. 5 is a sectional view of another embodiment of the invention;
Fig. 6 is a sectional view along line 6—6 of Fig. 5;
Fig. 7 is a sectional view along line 7—7 of Fig. 5;
Fig. 8 is a schematic diagram of the electrical circuit of the adjustable resistor apparatus of Figs. 5 to 7;
Fig. 9 is a sectional view of still another embodiment of the invention; and
Fig. 10 is a sectional view along line 10—10 of Fig. 9.

The adjustable resistor apparatus of Figs. 1 to 3 comprises a framework 10 which has two opposed surfaces 12 and 14 which are provided with grooves in which a pair of elongated resistance elements 16 and 18 and a pair of shorting bars 20 and 22 are located. Preferably the framework 10 is divided into two mating halves so that it can be assembled with ease.

A bushing 24 is secured at one end of the framework by a nut 26, and a shaft 28 is journalled in the bushing. The shaft 28 carries a wiper assembly which is composed of an insulating member 30 and a pair of shorting-type wiper contacts 32 and 34. A pin 35 secures the wiper assembly to the shaft 28. Each of the resistance elements has an elongated contact area which extends along a straight line, and each of the shorting contacts serves to provide a connection between one of the resistance elements and the associated shorting bar.

It is desirable that the wiper contacts 32 and 34 extend from opposite sides of the insulating member 30 so as to provide a balanced load on the shaft which moves the wiper assembly. With such an arrangement, the wiper can be moved throughout its path of movement without causing side thrust on the shaft 28 which would tend to cause the shaft to bind in its supporting bushing.

The wiper member 30 is provided with a slot 36, and a guide member 38 extends through the slot to guide and stabilize the wiper assembly at any location along the resistance elements. Preferably, a pair of slots 40 and 42 are provided at opposite ends of the framework for supporting the guide member 38, so that the guide member may be installed simply by inserting it into slots before the housing has been placed in position.

A housing 44 of cylindrical shape is adapted to slide over the framework when it is assembled, and the housing serves to secure the guide member 38 in its slots and to provide a closure for the entire apparatus. A pair of O-rings 46 and 48 may be employed at opposite ends of the framework for providing a fluid-tight seal between the housing and the interior of the apparatus.

If desired, a mounting bracket 50 may be provided at one end of the resistor apparatus to provide a convenient arrangement for mounting the device.

As illustrated in Fig. 2, the two ends of each resistance element may be connected to a pair of wires 52 and 54, and the associated shorting bar may be connected to another wire 56. With such an arrangement, the two ends of the resistance element may be connected to any desired electrical apparatus and the electrical signal which is provided on the lead 56 represents the location of the wiper element along the resistance element. If desired, the end of the apparatus through which the wires extend may be closed by an insulating potting compound 58, or by a strain relief bushing, or the connections may be made to a multiple header or plug.

In this embodiment of the invention, the framework 10 and the wiper member 30 may be composed of insulating material such as a plastic. The bushing 24, the housing 44, and the bracket 50 may be composed of an alloy of aluminum such as Duralumin, and the shaft 28 may be composed of steel.

Fig. 4 is a sectional view similar to that of Fig. 3 showing how four resistance elements 16A, 16B, 18A and 18B and four shorting bars 20A, 20B, 22A and 22B may be employed in this embodiment of the invention.

The embodiment shown in Figs. 5, 6 and 7 is similar to that shown in Figs. 1 to 3, and the primary differences are the arrangement for supporting the wiper assembly on the shaft so as to permit free rotation of the shaft without the possibility of backlash in the wiper assembly, and the arrangement for providing electrical connections to the resistance elements.

In this embodiment of the invention, the resistance elements and shorting bars are carried by a pair of element holders 60 and 62. A wiper member 64 is journalled on the end of the shaft 66, and a helical spring 68 abuts against a C-ring 70 to provide a spring load on the wiper assembly. As before, a guide member 72 extends through a slot in the wiper member to guide and stabilize it. The shaft 66 may be rotated without affecting the action of the wiper assembly, since the wiper assembly is journalled on the end of the shaft.

Additional guiding action for the wiper assembly may be provided by causing the lower portion of the wiper member 64 to ride in a groove 67 located in the framework 74, as shown in Fig. 5. With such a guiding arrangement, the guide member 72 may be omitted if precise guiding action is not required.

In order to provide an effective seal between the shaft 66 and the framework 74, a pair of bushings 76 and 78 are provided with a seal 79 located between them. As before, a pair of O-rings 80 and 81 provide a seal between the framework 74 and the outer housing 82.

Fig. 8 shows the electrical connections which are made to the resistance elements of the embodiment shown in Figs. 5 to 7. In addition to the connections to the two ends of the resistance elements and the adjustable contact, one or more fixed taps may be provided along each resistance element. Thus, four or more wires leading to the exterior of the adjustable resistance apparatus may be required for each of the resistance elements.

Fig. 7 illustrates a suitable arrangement for providing the required electrical connections. The two sets of four conductors are provided by two cables 83 and 84. The cables are secured in place by clamps 86 which in turn are secured in place by a pair of screws 88 and 90 which engage threads in the framework 74. A potting compound 92 may be applied around this assembly so as to provide a fluid-tight closure at that end of the apparatus. Such a lead through system holds both the orientation and spacing of the cables exactly in place.

The embodiment of the invention shown in Figs. 9 and 10 is similar to that shown in the other embodiments of the invention. It differs primarily in that the framework 100 is composed of metal, and a conventional outlet plug 102 is employed to make electrical connections to the adjustable resistor apparatus. If desired, the end 104 of the framework may be threaded for use in mounting the apparatus.

The shaft 106 is journalled in a pair of bushings 108 and 110 which are carried by the framework. A fluid-tight seal is provided between the shaft and the framework by an O-ring 112. A pair of O-rings 114 and 116 provide a seal between the framework 100 and the housing 120. Preferably, a potting compound 121 is employed to provide a seal at the end of the apparatus adjacent the plug 102.

In this embodiment of the invention the wiper member 122 is journalled on the shaft 106, and a bowed E-spring 124 provides a spring load between the shaft and the wiper member. As before, a guide member 126 serves to guide and stabilize the wiper assembly at any position along the path of movement.

The shorting bars are carried by insulating members 128 and 130, and the resistance elements 132 and 134 are secured to the upper surface of the insulating members by clamps which are secured in place by screws 136 and 138.

Since this embodiment of the invention employs a framework 100 which is conductive, a ground connection may be employed between the framework and one terminal of the plug, as illustrated at 140. The conductive framework and the conductive housing provide an electrical shield around the apparatus of this embodiment of the invention.

It will be apparent that various numbers of resistance elements may be employed in the various embodiments of the invention, say any number from one to four. If more than two resistance elements are employed, they may be located one above the other as illustrated in Fig. 4.

Preferably, a balanced wiper assembly is employed so as to provide a balanced load on the shaft which actuates the wiper assembly. If only one resistance element is employed, a balanced wiper assembly may be employed by providing a shorting bar on the side of the wiper assembly which is opposite the side on which the resistance element is located. For example, in the embodiment of Fig. 3 the shorting bar 22 may be employed to provide a connection through the wiper to the resistance element 16 and the resistance element 18, and the shorting bar 20 may be omitted if only one resistance element is required.

Also, resilient springs may be employed to provide connections between the wiper and the exterior of the resistor apparatus. By way of example, two resistance elements may be located on opposite sides of the wiper assembly, with a pair of electrical contacts extending from opposite sides of the wiper assembly to provide sliding contacts on the resistance elements. The pair of wiper contacts may be connected to a pair of helical springs which extend between the wiper assembly and the end of the resistor apparatus which is opposite the end in which the wiper shaft is journalled, and these springs may be employed to provide electrical connections between the wiper contacts and the exterior of the apparatus.

We claim:

1. Adjustable resistor apparatus comprising at least one resistance element having an elongated contact area extending substantially along a straight line, a conductive bar extending alongside the contact area of the resistance element, a framework supporting the resistance element and the conductive bar, a shaft supported by the framework and movable along the contact area of the resistance element, wiper means located on the shaft and engaging the contact area of the resistance element and the conductive bar, a guide member extending between and loosely supported in slots in the two ends of the framework and engaging the wiper means to guide and stabilize it, and a housing adapted to slide over the framework to secure the guide member and to provide a closure for the apparatus.

2. Adjustable resistor apparatus comprising at least one resistance element having an elongated contact area, a conductive bar extending parallel with respect to the contact areas of the respective resistance elements, a framework supporting the resistance elements and the conductive bars, the framework having a cylindrical-shaped outer periphery, a shaft movable along the contact areas of the resistance elements, journal means located at one end of the framework for supporting the shaft, wiper means located on the shaft and engaging the contact areas of the resistance elements and the conductive bars, a guide member extending between and supported in slots in opposite ends of the framework and engaging the wiper means for stabilizing it, and a cylindrical housing adapted to slide over the framework to secure the guide member in the slots in the framework and to provide a closure for the apparatus.

3. The apparatus of claim 2 wherein the framework is composed of an insulating material and is provided with two opposed internal surfaces on which the resistance elements and the conductive bars are located, with the framework being divided into two mating halves so that it can be assembled with ease.

4. The apparatus of claim 2 wherein the framework is composed of metal, with the end of the framework at which the shaft enters extending beyond the cylindrical housing and having threads thereon for use in mounting the apparatus.

5. The apparatus of claim 4 further including an outlet plug secured in the end of the framework opposite the threaded end for providing electrical connections to the resistance elements.

6. Adjustable resistor apparatus comprising a pair of elongated resistance elements, a framework supporting the resistance elements with the elements extending substantially parallel with respect to one another, a shaft journalled in the framework and extending parallel with respect to the resistance elements, electrical wiper means located on the shaft for contacting the resistance elements, a guide member loosely supported in slots formed in the framework and extending parallel with respect to the shaft for guiding the wiper means and stabilizing it, and a housing adapted to slide over the framework to secure the guide member and to provide a closure for the apparatus.

7. Adjustable resistor apparatus comprising a pair of elongated resistance elements, a framework supporting the resistance elements with the elements extending substantially parallel with respect to one another, a shaft journalled in the framework and extending parallel with respect to the resistance elements and located between them, electrical wiper means located on the shaft and having electrical contacts extending from opposite sides for contacting the resistance elements, a guide member supported by the framework and extending parallel with respect to the shaft for guiding the wiper means and stabilizing it, a pair of O-rings located in grooves at the ends of the framework, and a housing adapted to slide over the framework and the O-rings to secure the guide member and to provide a closure for the apparatus.

8. Adjustable resistor apparatus comprising at least one resistance element having an elongated contact area, conductive means extending alongside the contact area of the resistance element, a framework supporting the resistance element and said conductive means, a shaft journalled at one end of the framework and movable along the contact area of the resistance element, wiper means located on the shaft for providing an electrical contact between the contact area of the resistance element and the adjacent conductive means, the framework having a pair of aligned slots located at opposite ends of the framework, a guide member supported in and extending between the slots in the framework and engaging the wiper means to guide and stabilize it, and a housing adapted to slide over the framework to secure the guide member in its slots and to provide a closure for the apparatus.

9. Adjustable resistor apparatus comprising at least one resistance element having an elongated contact area extending along a line, a framework supporting the resistance element, a shaft journalled at one end of the framework and movable along the contact area of the resistance element, wiper means located at one end of the shaft for providing an electrical contact between the contact area of the resistance element and the exterior of the resistor apparatus, spring loading means located between the shaft and the wiper means to permit rotation of the shaft with respect to the wiper means without backlash, the framework having a pair of aligned slots located at opposite ends of the framework, a guide member supported in and extending between the slots in the framework and engaging the wiper means to guide and stabilize it, and a housing adapted to slide over the framework to secure the guide member in its slots and to provide a closure for the apparatus.

10. Adjustable resistor apparatus comprising at least one resistance element having an elongated contact area, a framework supporting the resistance element, the framework having a cylindrical-shaped outer periphery, a shaft journalled at one end of the framework and movable along the contact area of the resistance element, an insulator journalled on the end of the shaft, a wiper mounted on the insulator for providing an electrical contact between the contact area of the resistance element and the exterior of the apparatus, spring loading means located between the shaft and the wiper insulator for coupling the wiper insulator to the shaft and permitting rotation of the shaft with respect to the wiper insulator without backlash, the framework having a pair of aligned slots located at opposite ends of the framework, a guide member supported in and extending between the slots in the framework and engaging the wiper insulator to guide and stabilize it, and a cylindrical housing adapted to slide over the framework to secure the guide member in its slots and to provide a closure for the apparatus.

11. Adjustable resistor apparatus comprising a plurality of resistance elements each having an elongated contact area, a conductive bar for each resistance element extending along the contact area of the resistance element, a framework supporting the resistance elements and the conductive bars, a shaft journalled in the framework and movable along the contact areas of the resistance elements, wiper means located on the shaft and having electrical contacts for providing an electrical connection between each resistance element and its asociated conductive bar, with the electrical contacts extending from opposite sides of the wiper means for providing a balanced load on the shaft, guide means loosely supported in slots provided in the framework for guiding the wiper means and stabilizing it, and a slidable housing disposed around the framework for providing a closure for the apparatus and for securing the guide means.

12. Adjustable resistor apparatus as defined in claim 8 wherein said framework has an outer periphery of predetermined shape, and said housing has an inner periphery of predetermined shape substantially similar to the predetermined shape of the outer periphery of said framework to facilitate mating sliding engagement of the. housing over the framework.

References Cited in the file of this patent

UNITED STATES PATENTS

| 2,339,721 | Wilson | Jan. 18, 1944 |
| 2,646,489 | McArron | July 21, 1953 |
| 2,706,230 | Bourns et al. | Apr. 12, 1955 |

FOREIGN PATENTS

| 27,711 | Netherlands | Mar. 15, 1932 |